(12) United States Patent
Saruta

(10) Patent No.: US 7,763,183 B2
(45) Date of Patent: Jul. 27, 2010

(54) ELECTRON BEAM-EXCITED BLUE PHOSPHOR

(75) Inventor: Shoshiro Saruta, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 485 days.

(21) Appl. No.: 11/860,729

(22) Filed: Sep. 25, 2007

(65) Prior Publication Data

US 2008/0081012 A1 Apr. 3, 2008

(30) Foreign Application Priority Data

Sep. 28, 2006 (JP) ............................. 2006-264090

(51) Int. Cl.
*C09K 11/77* (2006.01)
(52) U.S. Cl. ........................ 252/301.4 F; 252/301.4 S
(58) Field of Classification Search ........... 252/301.4 F, 252/301.4 S
See application file for complete search history.

(56) References Cited

U.S. PATENT DOCUMENTS 6,833,086 B2 12/2004 Kajiwara 7,311,858 B2 * 12/2007 Wang et al. ........... 252/301.4 F
7,597,822 B2 * 10/2009 Saruta .................. 252/301.4 F

FOREIGN PATENT DOCUMENTS

| DE | 20218718 U1 | 4/2004 |
| JP | 2-186537 A | 7/1990 |
| JP | 2971104 B | 8/1999 |
| JP | 2002-265942 A | 9/2002 |
| JP | 2002-348570 A | 12/2002 |
| JP | 2004-285363 A | 10/2004 |
| JP | 2004-307869 A | 11/2004 |
| WO | 2006/045195 A1 | 5/2006 |

OTHER PUBLICATIONS

F.-L. Zhang et al, "Low Voltage Cathodoluminescence Properties of Blue Emitting SrGa2S4:Ce3+ and ZnS:Ag,Cl Phosphors," 72(18) Appl. Phys. Lett. 2226-28 (May 1998).

* cited by examiner

*Primary Examiner*—C. Melissa Koslow
(74) *Attorney, Agent, or Firm*—Fitzpatrick, Cella, Harper & Scinto

(57) ABSTRACT

Provided is an electron beam-excited blue phosphor, which is a rare earth-activated alkaline earth thiosilicate represented by a general formula $M1_xM2_{2-x}Si_2O_yS_{6-y}Ra_z$ where M1 and M2 each represent an alkaline earth metal, Ra represents a rare earth ion $Ce^{3+}$ or $Eu^{2+}$, and x, y, and z satisfy relationships of $0 \leq x \leq 2$, $0 < y < 6$, and $z \geq 0.005$, respectively.

2 Claims, 4 Drawing Sheets

ELECTRON BEAM-EXCITED BLUE PHOSPHOR

BACKGROUND OF THE INVENTION

1. Field of the Invention

The present invention relates to an electron beam-excited blue phosphor.

2. Description of the Related Art

An image display apparatus utilizing light emission by electron beam excitation is a display device that provides a display apparatus which: is of a self-luminous type; has good color reproducibility and high luminance; and is excellent in dynamic image displaying property, and the image display apparatus has been put into practical use as a cathode ray tube (hereinafter, referred to as "CRT") since olden times.

Meanwhile, additional improvements in performance, size, and image quality have been requested of the image display apparatus in association with recent diversification and recent increase in density, of image information. In addition, a demand for a flat panel display (FPD) has been remarkably growing in recent years in association with an increase in needs of the time, such as energy savings and space savings.

In addition, a thin-film transistor-driven liquid crystal display device (TFT-LCD), a plasma display module (PDP) utilizing vacuum ultraviolet emission by plasma, and the like have already been put into practical use, and have replaced part of the market conventionally occupied by the CRT. However, the TFT-LCD has the following problem: bad dynamic image visibility resulting from a narrow view angle and bad responsiveness. In addition, the PDP has the following problems: insufficient luminance, bad responsiveness, and high power consumption. Any one of those problems may be fatal to a widespread use of the TFT-LCD or the PDP as a display that will completely replace the CRT in the future.

On the other hand, a field emission display (hereinafter, referred to as "FED") as a flat image display apparatus utilizing electron beam excitation has the following characteristics: the FED can respond at a high speed, has high luminance, and consumes small power. Accordingly, expectations have been placed on a commercial use of the FED in order that a full-fledged spread of the FPD may be achieved.

An outline of a structure of the FED is as described below. That is, devices each of which can serve as an electron source are placed on a rear plate in a matrix fashion in correspondence with respective pixels, and wiring necessary for driving these many devices is formed in a matrix fashion. A large number of forms have been proposed for the "electron source" in this case, and examples of the forms include an electron source belonging to a cathode tip having a three-dimensional structure, such as a so-called Spindt type electron source, a flat electron source, and an electron source using a carbon nanotube. An application of a voltage corresponding to image information to the electron sources through the wiring in a vacuum causes electrons corresponding to the image information to be emitted like beams.

In addition, a face plate has a layer formed of a phosphor that emits light by using an accelerated electron beam as an excitation source. An application of a high voltage between the rear plate and the face plate accelerates electron beams emitted from the electron sources. The accelerated electron beams provide the phosphor with necessary excitation energy, whereby an image corresponding to the image information is formed.

In addition, in the face plate, charge accumulating on the layer of the phosphor that is substantially an insulating substance must be efficiently removed, and light emitted from the phosphor must be efficiently reflected. Accordingly, a film made of a metal having a small atomic number such as aluminum, which is called metal back, is generally formed on the layer of the phosphor. However, energy loss due to the metal film becomes significant in an FED to be used in a region where an acceleration voltage is low, so a conductive transparent film made of, for example, an indium tin oxide is formed on a face plate in some cases.

In addition, the FED is driven via the above mechanism, so a high-vacuum container having a degree of vacuum of about $10^{-4}$ Pa or more is needed. Accordingly, a frame having an appropriate thickness is inserted between the face plate and the rear plate before both the plates are bonded to each other. In addition, multiple parts each referred to as a spacer are placed between the face plate and the rear plate because the plates must be supported against atmospheric pressure. In addition, in general, the container is evacuated to be a vacuum container.

In ordinary cases, each spacer is placed between adjacent pixels of the phosphor, that is, on a black non-light-emitting region (black matrix) provided for suppressing reflection of external light. In addition, in general, the number of spacers to be placed should be sufficient for sufficiently support against the atmospheric pressure.

By the way, an interval between a cathode plate on an electron source side and the face plate as an anode in the FED characterized by its flatness is typically reduced to several millimeters, so an acceleration voltage of 25 kV or more cannot be applied unlike the CRT from the viewpoint of a withstand voltage. Accordingly, even an FED of a high-voltage type is said to be capable of withstanding an acceleration voltage of only about 15 kV or less.

As a result, a depth at which an excited electron penetrates into the layer of the phosphor cannot help being shallower than that in the case of the CRT, so adoption of, for example, a high current density or line-sequential driving is indispensable for realization of luminance needed for practical use, which is equivalent to that of the CRT.

The foregoing strongly requests, of the phosphor, not only realization of high luminous efficiency but also securement of luminance linearity in a high current region and stability of luminance against an input of charge. Further, the realization of a high-level display device requires the phosphor to show a luminescent color having high color purity.

By the way, electron beam-excited phosphors that can be currently put into practical use in terms of properties including luminous efficiency and a color purity are limited to a group of zinc sulfide phosphors each referred to as EIA name "P22", the phosphors being adopted in most CRT's.

Such phosphor using zinc sulfide as a host material does not have sufficient stability against the input of charge. Accordingly, the luminance of such phosphor is expected to deteriorate remarkably in an FED to be operated in a higher current region than that in the case of the CRT.

In addition, various problems have been pointed out: a sulfur atom (S) dissociated by thermal energy generated by the input of charge scatters in a vacuum container to reduce the degree of vacuum of the container, and furthermore, adversely affects an electron source.

Further, the above problems are particularly notable in a blue phosphor "ZnS:Ag phosphor" that requires the highest current because one has difficulty in visually feeling luminous efficiency.

To solve the above problems, there have been proposed, for example, a method of producing a zinc sulfide phosphor having a small number of crystal defects as disclosed in JP 2002-265942 A and a step of correcting the crystal defect or surface strain layer of a zinc sulfide phosphor as disclosed in JP 2004-307869 A, and some degree of alleviating effects on the problems have been obtained.

However, a zinc sulfide phosphor has, in addition to a problem concerning lack of stability against the input of charge, the following problem: luminance linearity deteriorates in a high current region.

The problem is due to, for example, the following reasons: the mechanism via which the zinc sulfide phosphor emits light is a second order reaction referred to as a donor-acceptor pair light emission type, and a donor-acceptor concentration cannot be sufficiently increased due to problems such as concentration quenching.

As described above, development of an electron beam-excited blue phosphor that may replace the zinc sulfide phosphor has been strongly demanded.

Meanwhile, an improvement in stability against the input of charge with, for example, such surface protective film as disclosed in JP 2004-285363 A has also been proposed. In the proposal, a surface protective film made of, for example, a phosphate is used, and its applications are not limited to a zinc sulfide phosphor. However, according to an experiment conducted by the inventors of the present invention, the improving effect of the film on the stability was not sufficiently large, and a problem such as the introduction of adsorbed water into a vacuum container occurred.

A projection tube (PRT) has also been put into practical use as a cathode ray tube using a high current as in the case of the FED, but a zinc sulfide phosphor has been adopted for a blue color from the viewpoints of a color purity and luminous efficiency. There has been proposed, for example, a method of correcting a phenomenon called current luminance saturation on a driver circuit side as disclosed in JP 2971104 B or JP 02-186537 A. However, the method disclosed in each of the documents is a method involving increasing a display screen load, and is not preferable in terms of stability against the input of charge.

Proposals such as cooling of a tube surface have been proposed against problems concerning the deterioration of luminance in association with the input of charge and the spread of a spectral band width due to heat generation, and have been put into practical use. At present, however, the proposals have not sufficiently solved the problems yet.

Meanwhile, a search and investigation for a phosphor except zinc sulfide have also been conducted with a view to solving those problems. For example, a $Y_2SiO_5:Ce^{3+}$ phosphor referred to as EIA name "P47" has been commercialized and adopted as a blue phosphor for a beam indexing tube belonging to a special cathode ray tube.

The P47 phosphor uses an oxide as a host material and is generally said to have higher stability against the input of charge than that of a zinc sulfide phosphor.

In addition, the mechanism via which $Ce^{3+}$ emits light is quick first order attenuation in association with the allowed inner shell transition of 4f5d, and the phosphor is excellent in luminance linearity in a high current region because the phosphor has a high recycling rate of a luminescent center.

The fact that the phosphor is excellent in those properties can be actually confirmed by evaluation conducted by the proposers. However, the width of the emission spectrum of the phosphor cannot be narrowed because of, for example, the following reasons: the 5d splitting energy of $Ce^{3+}$ in a $Y_2SiO_5$ crystal is not sufficiently high, and the splitting of an f orbital in association with a spin-orbit interaction is relatively large. Therefore, the development of any other phosphor host material is needed for obtaining a blue luminescent color having a sufficient purity.

On the other hand, there are some reports concerning the light-emitting property by electron beam excitation of a $BaMgAl_{16}O_{27}:Eu$ phosphor for blue illumination known to show a high color purity and high luminance by vacuum ultraviolet light excitation. However, according to the reports, the phosphor deteriorates due to remarkable blackening as a result of irradiation with an electron beam, and causes a problem upon practical use.

In addition, the experiment conducted by the inventors of the present invention actually provided similar results: the host material of the phosphor started to color in association with irradiation with an electron beam, and hence the luminance of the phosphor reduced.

On the other hand, a report on a $CaMgSi_2O_6:Eu$ phosphor similarly known to show a high color purity and high luminance by vacuum ultraviolet light excitation is limited to Appl. Phys. Lett., 72, 1998, 2226 by F. L. Zhang et al in which the phosphor is simply evaluated for behavior after electron beam excitation in a low current region. However, the experiment conducted by the inventors of the present invention has provided the following results: with regard to chromaticity, the $CaMgSi_2O_6:Eu$ phosphor can provide a blue color having a higher purity than that in the case of the P22 phosphor, but the luminance and lifetime of the $CaMgSi_2O_6:Eu$ phosphor are substantially comparable to those of the P22 phosphor. A mechanism different from that of zinc sulfide has been proposed for the problem concerning the lifetime.

That is, the mechanism is as follows: an oxygen vacancy is present in the surface of a phosphor, and an oxygen atom in a bulk responsible for the transfer of energy to a luminescent center moves toward the vacancy as a result of the input of excitation energy. JP 2002-348570 A discloses a method based on a reheat treatment in an oxygen atmosphere for solving the problem. However, the method has not been preferable because the luminescent center is apt to be prevented from emitting light due to the oxidation of a luminescent center metal ion $Ce^{3+}$ or $Eu^{2+}$.

As described above, the FED requires a blue phosphor which: shows sufficiently satisfactory color purity under low and medium acceleration voltages of about 15 kV or less; secures luminance linearity in a high current region; and stably emits light against the input of charge.

SUMMARY OF THE INVENTION

The present invention relates particularly to a blue phosphor for electron beam excitation.

The present invention provides an electron beam-excited blue phosphor including a rare earth-activated alkaline earth thiosilicate represented by a general formula $M1_xM2_{2-x}Si_2O_yS_{6-y}Ra_z$ where M1 and M2 each represent an alkaline earth metal, Ra represents a rare earth ion $Ce^{3+}$ or $Eu^{2+}$, and x, y, and z satisfy relationships of $0 \leq x \leq 2$, $0 < y < 6$, and $z \geq 0.005$, respectively.

Further features of the present invention will become apparent from the following description of exemplary embodiments with reference to the attached drawings.

DESCRIPTION OF THE EMBODIMENTS

Figure 1:
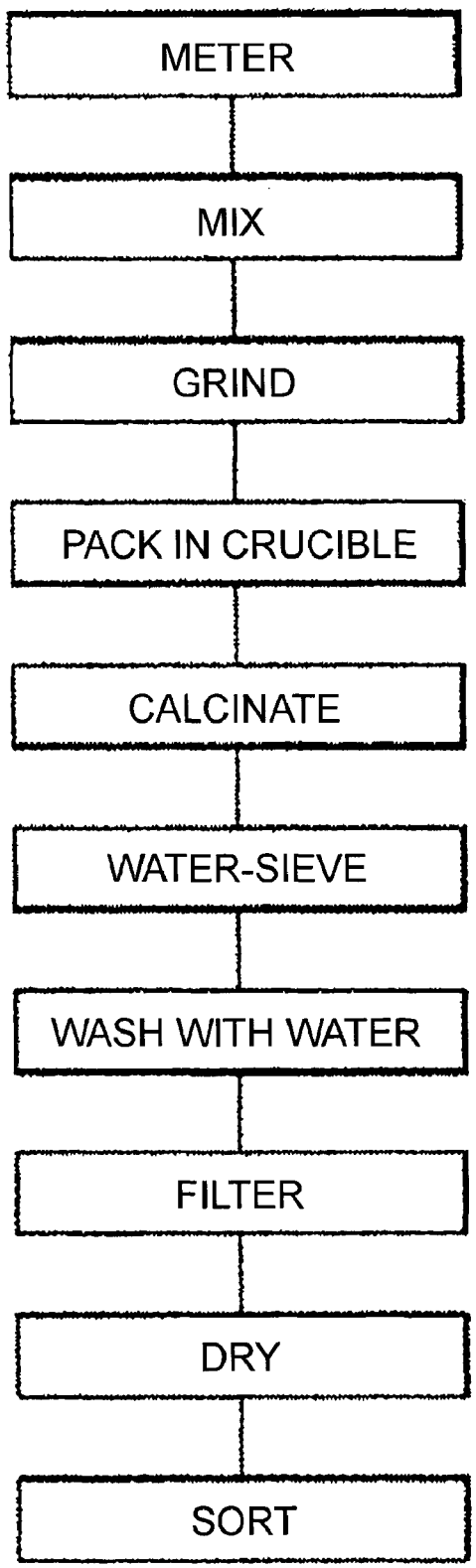
FIG. 1 is a production step flow for a rare earth-activated alkaline earth silicate phosphor used in the present invention.

An electron beam-excited blue phosphor of the present invention is a rare earth-activated alkaline earth thiosilicate represented by a general formula $M1_xM2_{2-x}Si_2O_yS_{6-y}Ra_z$ (where M1 and M2 each represent an alkaline earth metal, Ra represents a rare earth ion $Ce^{3+}$ or $Eu^{2+}$, and x, y, and z satisfy the relationships of $0 \leq x \leq 2$, $0<y<6$, and $z \geq 0.005$).

In the present invention, the body color of the phosphor measured with a D65 light source and a 2-degree field of view is preferably in the range of $a^*>0$ and $b^*<0$, and furthermore, an angle $\phi$ formed by the straight line connecting the point of the body color and the origin relative to an $a^*$ axis in an $L^*a^*b^*$ calorimetric chromaticity diagram preferably satisfies the relationship of $39°<\phi<60°$.

The electron beam-excited blue phosphor of the present invention shows sufficiently satisfactory color purity under low and medium acceleration voltages of about 15 kV or less, secures luminance linearity in a high current region, and stably emits light against the input of charge.

Hereinafter, an embodiment of the present invention will be described in detail.

An electron beam-excited blue phosphor of this embodiment is a phosphor represented by a formula $M1_xM2_{2-x}Si_2O_yS_{6-y}Ra_z$ obtained by substituting part of the oxygen atoms of a rare earth-activated alkaline earth silicate phosphor represented by a general formula $M1_xM2_{2-x}Si_2O_6Ra_z$ with sulfur atoms. The substitution can be achieved by a reductive high-temperature annealing treatment in an $H_2S$ or S gas atmosphere. The substitution is mainly the capping of O atoms and O vacancies present in the surface of the phosphor. In other words, the substitution reduces the number of the O vacancies in the surface of the phosphor. The reduction leads to a suppressing effect on the diffusion of the O atoms, the O atoms each contributing as a donor of energy to a luminescent center metal in a bulk, to the surface of the phosphor as a non-light-emitting region, whereby a phenomenon in which the luminance of the phosphor deteriorates over time due to the input of charge can be reduced.

For example, a reduction in number of O vacancies can be observed as a result of annealing in the atmosphere, but the oxidation of $Ce^{3+}$ or $Eu^{2+}$ as a luminescent center metal represented by Ra in the general formula occurs, thereby causing the problem of a significant reduction in luminance of the phosphor. Although a reducing atmosphere is indispensable for annealing, a reducing atmosphere such as a CO atmosphere or an $H_2$ atmosphere is not preferable because the atmosphere deprives the surface of the phosphor of oxygen atoms, with the result that an increase in number of O vacancies occurs.

The body color of the host material of the phosphor gradually changes from a bluish color to a reddish color depending on the degree of the substitution or capping of the above O vacancies with S atoms. In the case where the degree of the body color is observed with a D65 light source and a 2-degree field of view, the body color is in the region of $b^*<0$ and $a^*>0$. In the case where an angle formed by the straight line connecting the address point of the body color and the origin relative to an $a^*$ axis is represented by $\phi$, a certain effect on the lifetime of the phosphor is observed for $\phi<60°$. In addition, the case where $\phi$ satisfies the relationship of $\phi<39°$ is not preferable because the luminance of the phosphor reduces due to an excessively strong filter effect by the body color, though a sufficient effect on the lifetime of the phosphor can be observed. Therefore, $\phi$ desirably satisfies the relationship of $39°<\phi<60°$.

Here, the elements M1 and M2 each represent an alkaline earth metal such as magnesium, calcium, barium, or strontium, and the elements M1 and M2 are different from each other.

In addition, Si represents a silicon element, O represents an oxygen element, S represents a sulfur element, and Ra represents a rare earth element chosen from cerium and europium. x and y each representing a molar ratio in the general formula more suitably satisfy the relationships of $0 \leq x \leq 2$ and $0<y<6$.

In addition, z desirably satisfies the relationship of $z \geq 0.005$. The case where z satisfies the relationship of $z<0.005$ is not preferable because current saturation occurs at a relatively low current density.

The composition of the phosphor including those pieces of quantitative information can be identified by ICP, a glow discharge mass spectrum, or a combination such as a combustion-coulometric titration method or a combustion-infrared absorption method.

The element M1 most preferably represents Ca, and the element M2 most preferably represents Mg.

A rare earth-activated alkaline earth silicate phosphor having such constitution emits blue light having a good color purity and high luminous efficiency by being excited through irradiation with an electron beam.

In particular, when the phosphor is provided with a structure in which part of oxygen atoms are substituted with sulfur atoms, the number of oxygen vacancies in the surface of the phosphor is reduced by capping with sulfur atoms. Accordingly, the movement of an oxygen atom in a bulk, the oxygen atom providing a luminescent center metal with energy for light emission, to an oxygen vacancy in the surface of the phosphor by the input of excitation energy is suppressed. As a result, a phosphor which has a long lifetime, in other words, is stable against the input of charge can be obtained.

Meanwhile, the above structure in which part of oxygen atoms are substituted with sulfur atoms needs the steps of: synthesizing a structure corresponding to y=6 in the above general formula, that is, a silicate phosphor having two kinds of elements, that is, the elements M1 and M2 as alkaline earth metals at x=1; and annealing in an $H_2S$ or S atmosphere at high temperatures. In this case, the body color of the phosphor, which is bluish, changes to a reddish color. The extent to which the color changes depends on the temperature at the time of the annealing; the extent to which the color changes increases with increasing temperature.

The extent to which the color changes can be quantitatively estimated by the measurement of the diffuse reflectance of the phosphor. That is, a method of measuring the diffuse reflectance with a D65 light source or a C light source and with a 2-degree or 10-degree field of view can be employed. The color of the phosphor can be represented in an $L^*a^*b^*$ calorimetric system on the basis of the spectrum of the measured diffuse reflectance.

The color of the rare earth-activated alkaline earth thiosilicate phosphor presented in this proposal is in the range of $a^*>0$ and $b^*<0$. The $L^*a^*b^*$ values of the phosphor is calculated from the diffuse reflectance of the phosphor measured with a D65 light source and a 2-degree field of view, and is plotted in an $L^*a^*b^*$ calorimetric chromaticity diagram. In this case, when an angle formed by the straight line connecting the plotted point and the origin relative to an $a^*$ axis is represented by φ, an improving effect on the stability of the luminance of the phosphor against the input of charge is observed for φ<60°.

On the other hand, the case where φ satisfies the relationship of φ<39° is not preferable because the absorbing effect of the host material of the phosphor on light emitted from the phosphor strengthens, with the result that the luminance of the phosphor reduces.

Therefore, φ must satisfy the relationship of 39°<φ<60°.

EXAMPLES

Hereinafter, the present invention will be described in detail by way of comparative examples and specific examples.

Comparative Example 1

| | |
|---|---|
| Calcium carbonate (guaranteed reagent, manufactured by Kishida Chemical Co., Ltd.) | 8.01 g |
| Magnesium oxide (guaranteed reagent, manufactured by Kishida Chemical Co., Ltd.) | 3.23 g |
| Silicon oxide (IV) (manufactured by Kojundo Chemical Laboratory Co., Ltd.) | 10.03 g |
| Europium chloride (III) (manufactured by Kojundo Chemical Laboratory Co., Ltd.) | 0.21 g |

The above compounds were each metered with a chemical balance, and were mixed. After that, the mixture mixed with acetone was sufficiently ground with an agate mortar, and then the whole was dried at 140° C. for 1 hour, whereby a precursor before calcination was prepared.

3 g of the precursor were packed in a 30-cc alumina crucible. The crucible was placed in a high-temperature atmosphere furnace in which a 5% $H_2/N_2$ mixed gas was caused to flow at a flow rate of 0.3 L/min, and the precursor was calcined at 1,250° C. for about 90 minutes. The gas was continuously caused to flow until the temperature of the precursor became 450° C. or lower. After having been slowly cooled to normal temperature, the calcined product was taken out.

The phosphor after the calcination was taken in 100 cc of pure water through a nylon 100 mesh lest a product peeled from the crucible should mix into the phosphor.

The suspension of the phosphor taken in pure water was sufficiently stirred with a magnetic stirrer. Next, the suspension was left standing so that the phosphor was precipitated, followed by the removal of the supernatant. The washing step was repeated 5 times, whereby an unnecessary calcination residue was removed.

The phosphor after the washing was filtrated with a Buchner funnel and an aspirator, and was dried at 140° C. for 5 hours.

Finally, the phosphor was subjected to vibration sorting with an SUS400 mesh, whereby a rare earth-activated alkaline earth silicate phosphor $CaMgSi_2O_6Eu_{0.01}$ was obtained.

FIG. 1 shows the flow of the above steps.

Figure 3:
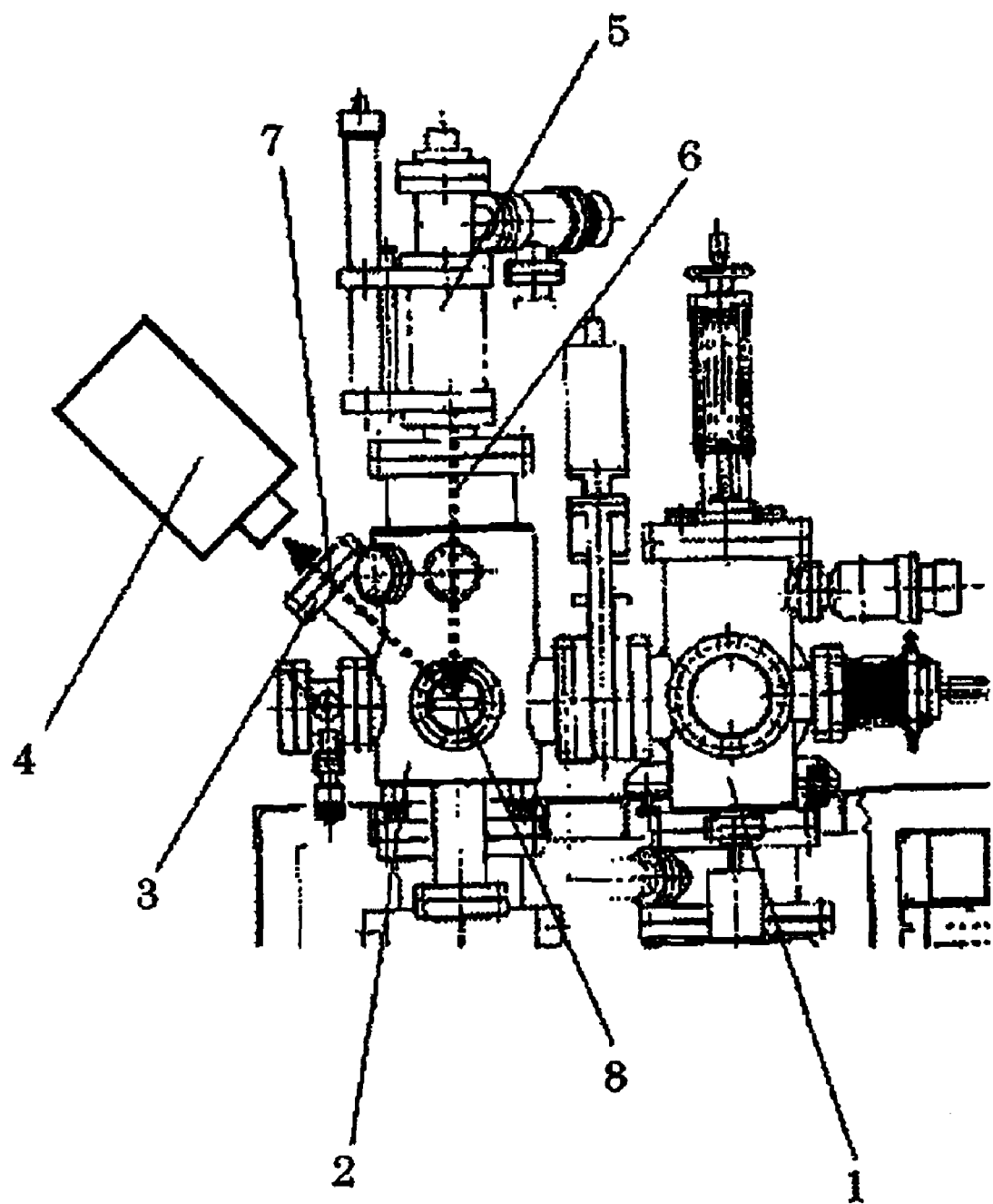
FIG. 3 is a schematic view of a demountable reflection CL luminance measuring apparatus used in each of examples and comparative examples of the present invention.

The phosphor 8 thus obtained was placed in a sample chamber 1 in a demountable reflection CL luminance evaluating apparatus shown in FIG. 3. The sample chamber 1 was evacuated to a high vacuum of $1 \times 10^{-5}$ Pa, and then the phosphor 8 was transferred to an evaluation chamber 2 having a degree of vacuum of $1 \times 10^{-7}$ Pa. The phosphor 8 was caused to emit light by being excited through the application of a rectangular current pulse 6 having an acceleration voltage of 10,000 V, a current density of 0.01 A/cm², a frequency of 500 Hz, and a half width of 0.00002 s from an electron gun 5.

The luminance 7 and chromaticity of the emitted light were measured through an observation window 3 made of Kovar with a BM7 luminance meter 4 manufactured by TOPCON CORPORATION with a 1-degree field of view. It should be noted that the chromaticity was corrected in view of the transmittance of Kovar.

The measured luminance was $3.9 \times 10^{-3}$ cd/m², and the measured chromaticity coordinates (x, y) were (0.150, 0.042).

In addition, the phosphor was caused to emit light under the same excitation conditions. A time period required for the luminance under measurement to be reduced to 70% of the initial luminance was represented by t, and an input charge quantity $\tau_{70}$ was calculated. As a result, the quantity was 101 (C/cm²). It should be noted that the input charge quantity was calculated from the following equation by using an electron beam irradiation time t:

$$Q = Ie \cdot t \cdot Pw/f.$$

In the equation, Q represents an input charge quantity (C/cm²), Ie represents a current density (A/cm²), t represents a time (s), Pw represents the half width (s) of an applied current pulse, and f represents the frequency (Hz) of the pulse.

Figure 4:
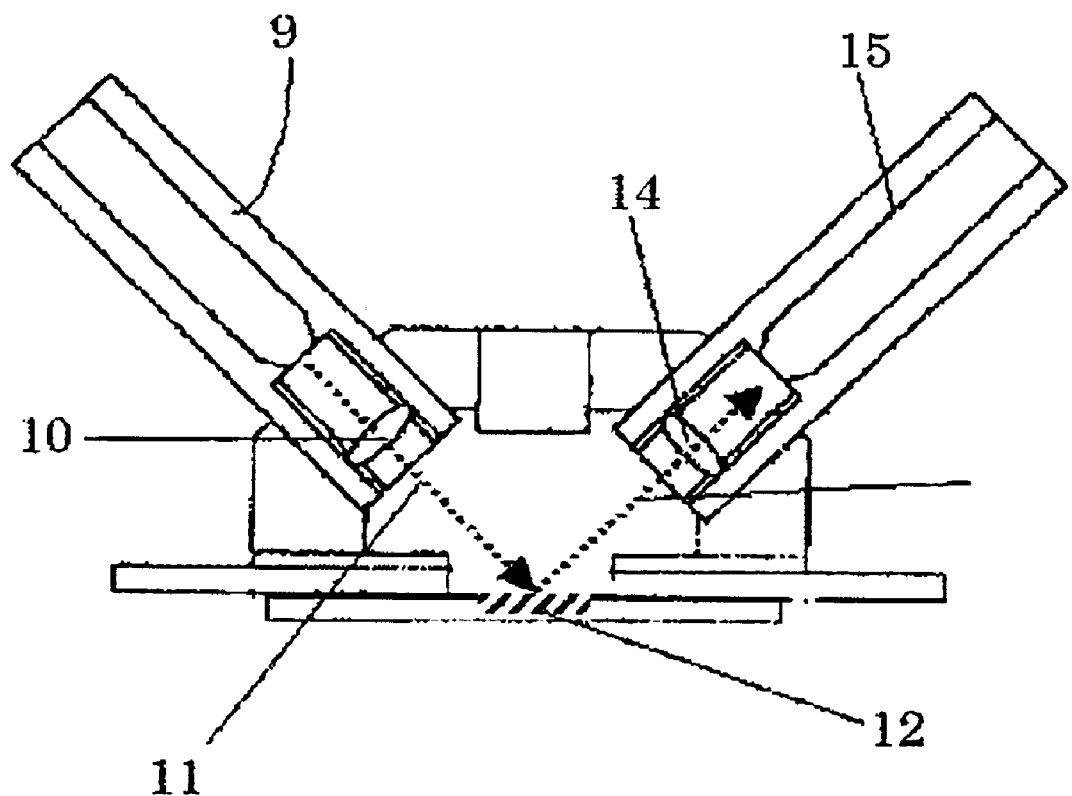
FIG. 4 is a schematic view of a diffuse reflectance evaluation unit used in each of the examples and comparative examples of the present invention.

Meanwhile, 0.5 g of the phosphor was pelletized by pressure molding. The pellet was placed in a diffuse reflectance measurement unit having a structure shown in FIG. 4, and the diffuse reflectance of the pellet 12 was measured with an MCPD-2000 manufactured by OTSUKA ELECTRONICS CO., LTD. In FIG. 4, reference numeral 9 represents a light source side fiber holder, reference numeral 10 represents a light source side lens, reference numeral 11 represents light, reference numeral 14 represents a reflection side lens, and reference numeral 15 represents a reflection side fiber holder. Next, a value for L*a*b* under D65 light source/2-degree field of view conditions was determined by using data on the diffuse reflectance. As a result, coordinates (a*, b*) were (1.487, −6.057), and an angle φ formed by the straight line connecting the plotted point and the origin relative to an a* axis was 76.2°.

Comparative Example 2

A ZnS:Ag,Cl phosphor (manufactured by Kasei Optonix, Ltd., P22-B1 type) was placed in the same demountable reflection CL luminance evaluating apparatus as that of Comparative Example 1. The phosphor was caused to emit light by being excited through the application of a rectangular current pulse having an acceleration voltage of 10,000 V, a current density of 0.01 A/cm², a frequency of 500 Hz, and a half width of 0.00002 s from an electron gun, and the luminance and chromaticity of the emitted light were measured. As a result, the measured luminance was $3.9 \times 10^{-3}$ cd/m², and the measured chromaticity (x, y) were (0.151, 0.052).

In addition, similarly to Comparative Example 1, a time period required for the luminance under measurement to be reduced to 70% of the initial luminance was represented by t, and an input charge quantity $\tau_{70}$ was calculated. As a result, the quantity was 99 (C/cm²)

In addition, the diffuse reflectance of the phosphor was measured in the same manner as in Comparative Example 1. Next, a value for L*a*b* under D65 light source/2-degree field of view conditions was determined by using data on the diffuse reflectance. As a result, coordinates (a*, b*) were (1.001, −7.039), and an angle φ formed by the straight line connecting the plotted point and the origin relative to an a* axis was 81.9°.

Example 1

2 g of a $CaMgSi_2O_6Eu_{0.01}$ phosphor obtained in the same manner as in Comparative Example 1 were mounted on a 50-cc quartz board. Next, the resultant was encapsulated in a quartz annular furnace, and the pressure in the furnace was reduced to about $10^{-2}$ Pa with a vacuum pump. After that, a 5% $H_2S/Ar$ mixed gas was caused to flow at a flow rate of about 0.1 L/min, and the phosphor was annealed at a temperature of 600° C. for 0.5 hour. Thus, a phosphor having a composition $CaMgSi_2O_{5.98}S_{0.02}Eu._{0.01}$ was obtained.

Figure 2:
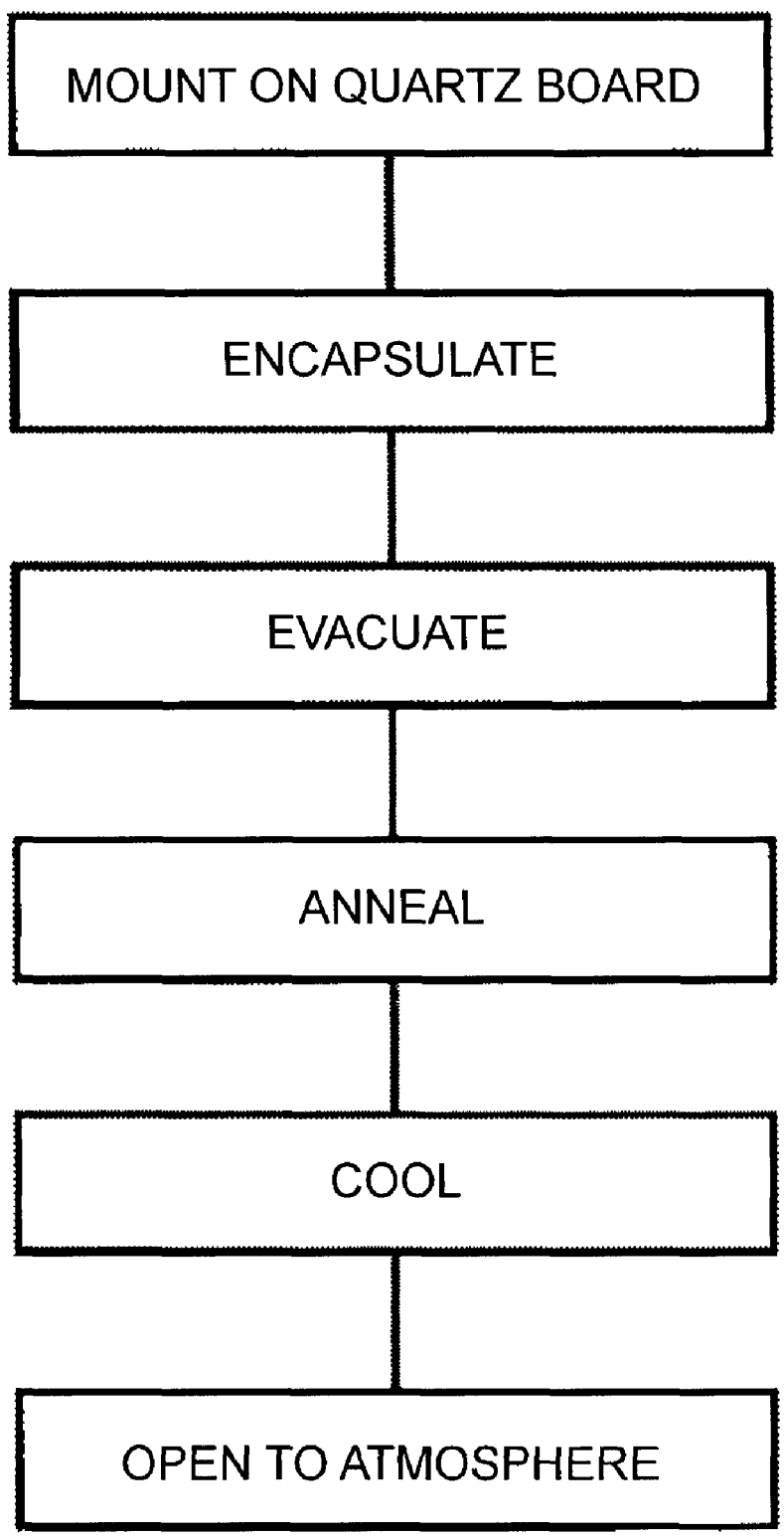
FIG. 2 is a production step flow for a rare earth-activated alkaline earth thiosilicate phosphor used in the present invention.

FIG. 2 shows the flow of the steps.

In addition, the phosphor was placed in the same demountable reflection CL luminance evaluating apparatus as that of Comparative Example 1. The phosphor was caused to emit light by being excited through the application of a rectangular current pulse having an acceleration voltage of 10,000 V, a current density of 0.01 A/cm², a frequency of 500 Hz, and a half width of 0.00002 s from an electron gun, and the luminance and chromaticity of the emitted light were measured. As a result, the measured luminance was $3.9 \times 10^{-3}$ cd/m², and the measured chromaticity (x, y) were (0.151, 0.041).

In addition, similarly to Comparative Example 1, a time period required for the luminance under measurement to be reduced to 70% of the initial luminance was represented by t, and an input charge quantity $\pi_{70}$ was calculated. As a result, the quantity was 151 (C/cm²)

In addition, the diffuse reflectance of the phosphor was measured in the same manner as in Comparative Example 1. Next, a value for L*a*b* under D65 light source/2-degree field of view conditions was determined by using data on the diffuse reflectance. As a result, coordinates (a*, b*) were (2.851, −4.900), and an angle φ formed by the straight line connecting the plotted point and the origin relative to an a* axis was 59.8°.

Example 2

2 g of a $CaMgSi_2O_6Eu_{0.01}$ phosphor obtained in the same manner as in Comparative Example 1 were mounted on a 50-cc quartz board. Next, the resultant was encapsulated in a quartz annular furnace, and the pressure in the furnace was reduced to about $10^{-2}$ Pa with a vacuum pump. After that, a 5% $H_2S/Ar$ mixed gas was caused to flow at a flow rate of about 0.1 L/min, and the phosphor was annealed at a temperature of 700° C. for 1.0 hour. Thus, a phosphor having a composition $CaMgSi_2O_{5.0}S_{1.0}Eu_{0.01}$ was obtained.

In addition, the phosphor was placed in the same demountable reflection CL luminance evaluating apparatus as that of Comparative Example 1. The phosphor was caused to emit light by being excited through the application of a rectangular current pulse having an acceleration voltage of 10,000 V, a current density of 0.01 A/cm², a frequency of 500 Hz, and a half width of 0.00002 s from an electron gun, and the luminance and chromaticity of the emitted light were measured. As a result, the measured luminance was $3.9 \times 10^{-3}$ cd/m², and the measured chromaticity (x, y) were (0.151, 0.041).

In addition, similarly to Comparative Example 1, a time period required for the luminance under measurement to be reduced to 70% of the initial luminance was represented by t, and an input charge quantity $\tau_{70}$ was calculated. As a result, the quantity was 175 (C/cm²)

In addition, the diffuse reflectance of the phosphor was measured in the same manner as in Comparative Example 1. Next, a value for L*a*b* under D65 light source/2-degree field of view conditions was determined by using data on the diffuse reflectance. As a result, coordinates (a*, b*) were (3.321, −4.521), and an angle φ formed by the straight line connecting the plotted point and the origin relative to an a* axis was 53.7°.

Example 3

2 g of a $CaMgSi_2O_6Eu_{0.01}$ phosphor obtained in the same manner as in Comparative Example 1 were mounted on a 50-cc quartz board. Next, the resultant was encapsulated in a quartz annular furnace, and the pressure in the furnace was reduced to about $10^{-2}$ Pa with a vacuum pump. After that, a 5% $H_2S/Ar$ mixed gas was caused to flow at a flow rate of about 0.1 L/min, and the phosphor was annealed at a temperature of 800° C. for 1.0 hour. Thus, a phosphor having a composition $CaMgSi_2O_{3.4}S_{2.6}Eu_{0.01}$ was obtained.

In addition, the phosphor was placed in the same demountable reflection CL luminance evaluating apparatus as that of Comparative Example 1. The phosphor was caused to emit light by being excited through the application of a rectangular current pulse having an acceleration voltage of 10,000 V, a current density of 0.01 A/cm², a frequency of 500 Hz, and a half width of 0.00002 s from an electron gun, and the luminance and chromaticity of the emitted light were measured. As a result, the measured luminance was $3.9 \times 10^{-3}$ cd/m², and the measured chromaticity (x, y) were (0.151, 0.041).

In addition, similarly to Comparative Example 1, a time period required for the luminance under measurement to be reduced to 70% of the initial luminance was represented by t, and an input charge quantity $\tau_{70}$ was calculated. As a result, the quantity was 191 (C/cm²)

In addition, the diffuse reflectance of the phosphor was measured in the same manner as in Comparative Example 1. Next, a value for L*a*b* under D65 light source/2-degree field of view conditions was determined by using data on the diffuse reflectance. As a result, coordinates (a*, b*) were (3.670, −4.234), and an angle φ formed by the straight line connecting the plotted point and the origin relative to an a* axis was 49.1°.

Example 4

2 g of a $CaMgSi_2O_6Eu_{0.01}$ phosphor obtained in the same manner as in Comparative Example 1 were mounted on a 50-cc quartz board. Next, the resultant was encapsulated in a quartz annular furnace, and the pressure in the furnace was reduced to about $10^{-2}$ Pa with a vacuum pump. After that, a 5% $H_2S/Ar$ mixed gas was caused to flow at a flow rate of about 0.1 L/min, and the phosphor was annealed at a temperature of 900° C. for 1.0 hour. Thus, a phosphor having a composition $CaMgSi_2O_{2.2}S_{3.8}Eu_{0.01}$ was obtained.

In addition, the phosphor was placed in the same demountable reflection CL luminance evaluating apparatus as that of Comparative Example 1. The phosphor was caused to emit light by being excited through the application of a rectangular current pulse having an acceleration voltage of 10,000 V, a current density of 0.01 A/cm², a frequency of 500 Hz, and a half width of 0.00002 s from an electron gun, and the luminance and chromaticity of the emitted light were measured. As a result, the measured luminance was $3.9 \times 10^{-3}$ cd/m², and the measured chromaticity (x, y) were (0.151, 0.041).

In addition, similarly to Comparative Example 1, a time period required for the luminance under measurement to be reduced to 70% of the initial luminance was represented by t, and an input charge quantity $\tau_{70}$ was calculated. As a result, the quantity was 205 (C/cm²)

In addition, the diffuse reflectance of the phosphor was measured in the same manner as in Comparative Example 1.

Next, a value for L*a*b* under D65 light source/2-degree field of view conditions was determined by using data on the diffuse reflectance. As a result, coordinates (a*, b*) were (4.060, −3.915), and an angle φ formed by the straight line connecting the plotted point and the origin relative to an a* axis was 44.0°.

Example 5

2 g of a $CaMgSi_2O_6Eu_{0.01}$ phosphor obtained in the same manner as in Comparative Example 1 were mounted on a 50-cc quartz board. Next, the resultant was encapsulated in a quartz annular furnace, and the pressure in the furnace was reduced to about $10^{-2}$ Pa with a vacuum pump. After that, a 5% $H_2S$/Ar mixed gas was caused to flow at a flow rate of about 0.1 L/min, and the phosphor was annealed at a temperature of 900° C. for 2.5 hours. Thus, a phosphor having a composition $CaMgSi_2O_{1.0}S_{5.0}Eu_{0.01}$ was obtained.

In addition, the phosphor was placed in the same demountable reflection CL luminance evaluating apparatus as that of Comparative Example 1. The phosphor was caused to emit light by being excited through the application of a rectangular current pulse having an acceleration voltage of 10,000 V, a current density of 0.01 A/cm$^2$, a frequency of 500 Hz, and a half width of 0.00002 s from an electron gun, and the luminance and chromaticity of the emitted light were measured. As a result, the measured luminance was $3.9\times10^{-3}$ cd/m$^2$, and the measured chromaticity (x, y) were (0.151, 0.041).

In addition, similarly to Comparative Example 1, a time period required for the luminance under measurement to be reduced to 70% of the initial luminance was represented by t, and an input charge quantity $\tau_{70}$ was calculated. As a result, the quantity was 211 (C/cm$^2$).

In addition, the diffuse reflectance of the phosphor was measured in the same manner as in Comparative Example 1. Next, a value for L*a*b* under D65 light source/2-degree field of view conditions was determined by using data on the diffuse reflectance. As a result, coordinates (a*, b*) were (4.360, −3.670), and an angle φ formed by the straight line connecting the plotted point and the origin relative to an a* axis was 40.1°.

Comparative Example 3

2 g of a $CaMgSi_2O_6Eu_{0.01}$ phosphor obtained in the same manner as in Comparative Example 1 were mounted on a 50-cc quartz board. Next, the resultant was encapsulated in a quartz annular furnace, and the pressure in the furnace was reduced to about $10^{-2}$ Pa with a vacuum pump. After that, a 5% $H_2S$/Ar mixed gas was caused to flow at a flow rate of about 0.1 L/min, and the phosphor was annealed at a temperature of 950° C. for 4.0 hours. Thus, a phosphor having a composition $CaMgSi_2S_6Eu_{0.01}$ was obtained.

In addition, the phosphor was placed in the same demountable reflection CL luminance evaluating apparatus as that of Comparative Example 1. The phosphor was caused to emit light by being excited through the application of a rectangular current pulse having an acceleration voltage of 10,000 V, a current density of 0.01 A/cm$^2$, a frequency of 500 Hz, and a half width of 0.00002 s from an electron gun, and the luminance and chromaticity of the emitted light were measured. As a result, the measured luminance was $3.4\times10^{-3}$ cd/m$^2$, and the measured chromaticity (x, y) were (0.150, 0.040).

In addition, similarly to Comparative Example 1, a time period required for the luminance under measurement to be reduced to 70% of the initial luminance was represented by t, and an input charge quantity $\tau_{70}$ was calculated. As a result, the quantity was 239 (C/cm$^2$)

In addition, the diffuse reflectance of the phosphor was measured in the same manner as in Comparative Example 1. Next, a value for L*a*b* under D65 light source/2-degree field of view conditions was determined by using data on the diffuse reflectance. As a result, coordinates (a*, b*) were (4.520, −3.540), and an angle φ formed by the straight line connecting the plotted point and the origin relative to an a* axis was 38.1°.

Table 1 summarizes the results of Comparative Examples 1 to 3 and Examples 1 to 5 described above. As can be seen from Table 1, in the range of 39°<φ<60°, the phosphors are identical to one another in luminance, and each have a high $\tau_{70}$. In addition, in this case, y satisfies the relationship of 0<y<6.

TABLE 1

| Examples | General Formula | Luminance (cd/m$^2$) | CIE Chromaticity x | CIE Chromaticity y | $\tau_{70}$ (C/cm$^2$) | L*a*b* a* | L*a*b* b* | φ (°) |
|---|---|---|---|---|---|---|---|---|
| Comparative Example 1 | $CaMgSi_2O_6Eu_{0.01}$ | $3.9\times10^3$ | 0.150 | 0.042 | 101 | 1.487 | −6.057 | 76.2 |
| Comparative Example 2 | ZnS:Ag, Cl | $3.9\times10^3$ | 0.151 | 0.052 | 99 | 1.001 | −7.039 | 81.9 |
| Example 1 | $CaMgSi_2O_{5.88}S_{0.02}Eu_{0.01}$ | $3.9\times10^3$ | 0.151 | 0.041 | 151 | 2.851 | −4.900 | 59.8 |
| Example 2 | $CaMgSi_2O_{5.0}S_{1.0}Eu_{0.01}$ | $3.9\times10^3$ | 0.151 | 0.041 | 175 | 3.321 | −4.521 | 53.7 |
| Example 3 | $CaMgSi_2O_{3.4}S_{2.6}Eu_{0.01}$ | $3.9\times10^3$ | 0.151 | 0.041 | 191 | 3.670 | −4.234 | 49.1 |
| Example 4 | $CaMgSi_2O_{2.2}S_{3.8}Eu_{0.01}$ | $3.9\times10^3$ | 0.151 | 0.041 | 205 | 4.060 | −3.915 | 44.0 |
| Example 5 | $CaMgSi_2O_{1.0}S_{5.0}Eu_{0.01}$ | $3.9\times10^3$ | 0.151 | 0.041 | 211 | 4.360 | −3.670 | 40.1 |
| Comparative Example 3 | $CaMgSi_2O_6Eu_{0.01}$ | $3.4\times10^3$ | 0.150 | 0.040 | 239 | 4.520 | −3.540 | 38.1 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-264090, filed on Sep. 28, 2006, which is hereby incorporated by reference herein in its entirety.

What is claimed is:

1. An electron beam-excited blue phosphor, comprising a rare earth-activated alkaline earth thiosilicate represented by a general formula $M1_xM2_{2-x}Si_2O_yS_{6-y}Ra_z$ where M1 and M2 each represent an alkaline earth metal, Ra represents a rare earth ion $Ce^{3+}$ or $Eu^{2+}$, and x, y, and z satisfy relationships of $0 \leqq x \leqq 2$, $0 < y < 6$, and $z \geqq 0.005$, respectively.

2. An electron beam-excited blue phosphor according to claim 1, wherein:
the phosphor has a body color measured with a D65 light source and a 2-degree field of view within a range of $a^* > 0$ and $b^* < 0$; and
an angle $\phi$ formed by a straight line connecting a point of the body color and an origin relative to an $a^*$ axis in an $L^*a^*b^*$ calorimetric chromaticity diagram satisfies a relationship of $39° < \phi < 60°$.

* * * * *